United States Patent [19]

McCormick

[11] 4,281,098

[45] Jul. 28, 1981

[54] CONTROL OF PHENOL/ALDEHYDE CONDENSATION REACTIONS

[75] Inventor: Bryan H. McCormick, South Glamorgan, Wales

[73] Assignee: BP Chemicals Limited, London, England

[21] Appl. No.: 87,739

[22] Filed: Oct. 24, 1979

[30] Foreign Application Priority Data

Oct. 25, 1978 [GB] United Kingdom ............... 41922/78

[51] Int. Cl.$^3$ ....................... C08G 8/04; C08G 8/08; C08G 8/10
[52] U.S. Cl. .................................. 528/139; 528/143; 528/144
[58] Field of Search ....................... 528/139, 143, 144

[56] References Cited

U.S. PATENT DOCUMENTS

| | | | |
|---|---|---|---|
| 1,799,816 | 4/1931 | Hole | 528/139 X |
| 2,579,610 | 12/1951 | Pitre et al. | 528/139 X |
| 2,736,701 | 2/1956 | Neff | 528/140 X |

FOREIGN PATENT DOCUMENTS

| | | |
|---|---|---|
| 423032 | 12/1925 | Fed. Rep. of Germany . |
| 701679 | 1/1941 | Fed. Rep. of Germany . |
| 1003956 | 3/1957 | Fed. Rep. of Germany . |
| 1720445 | 6/1971 | Fed. Rep. of Germany . |
| 880776 | 12/1961 | United Kingdom . |

OTHER PUBLICATIONS

Kirk et al., Encyclopedia of Chem. Technology, vol. 6, 1965, p. 131.

*Primary Examiner*—Howard E. Schain
*Attorney, Agent, or Firm*—Brooks, Haidt, Haffner & Delahunty

[57] ABSTRACT

Phenol/aldehyde condensation reactions are short-stopped by the addition of an aqueous solution of a salt of a weak acid and a metal of Groups III to VIII of the Periodic Table.

12 Claims, No Drawings

CONTROL OF PHENOL/ALDEHYDE CONDENSATION REACTIONS

The present invention relates to a process for retarding or stopping the condensation of phenols and aldehydes to give resins.

Various types of phenolic resins are made by reaction of phenols and aldehydes. Phenolic resols are made by reacting together phenols and aldehydes under alkaline conditions with a molar excess of the aldehyde. Reaction is catalysed by Group I or Group II metal hydroxides. Novolaks are made by condensing together phenols and aldehydes using a molar excess of phenol using strong acids as catalysts. The reactions are usually carried out by heating together the reactants in the presence of water in a stirred reactor to initiate reaction. Once the exothermic reaction has begun the heat of reaction is removed by suitable cooling means for example by using a reflux condenser. It is possible however for the reaction to proceed at such a rate that normal cooling facilities cannot remove sufficient heat. The temperature rises causing an increase in the rate of reaction, which causes a further temperature rise and the exothermic reaction can become so rapid that an explosion results. It is therefore desirable to be able to reduce the rate of reaction, or even to stop the reaction, when the reaction tends to escape from control. It will simplify the operation of a phenolic resin plant if the same method of retarding or stopping the reaction can be used for both the acid and alkaline catalysed reactions.

According to the present invention the process for retarding or stopping the condensation reaction between a phenol and an aldehyde in the presence of a Group I or Group II metal hydroxide or of a strong acid catalyst comprises adding to the reaction an aqueous solution containing at least 10% by weight based on the weight of water, of a salt of a weak acid and a metal of Groups III to VIII of the Periodic Table.

The phenol and aldehyde reacted together may be any of the phenols and aldehydes commonly used to give phenolic resins. It is preferred to use phenol itself, alkyl or alkenyl phenol, and cresol. The preferred aldehyde is formaldehyde, which is conveniently employed as an aqueous solution (formalin).

The reaction of the phenol and the aldehyde can be carried out at any of the molar ratios conventionally used in the production of phenolic resins for example the molar ratio of the phenol to the aldehyde may be from 0.5:1 to 3:1. The reaction may be carried out by methods well known in the art by stirring the phenol and the aldehyde together in the presence of a Group I or Group II metal hydroxide or a strong acid catalyst. Examples of suitable Group I or Group II hydroxides are sodium hydroxide, potassium hydroxide and calcium hydroxide. Sodium hydroxide is preferred.

Instead of Group I or Group II metal hydroxides acid catalysts may be used. These are strong acids and by strong acid we mean throughout this specification an acid having a $pK_a$ in aqueous solution at 25° C. of less than 2, e.g. sulphuric acid or oxalic acid (which has a $pK_a$ for a first dissociation of 1.2).

The salt which is added to retard or stop the reaction is a salt of a weak acid. By "weak acid" is meant throughout the specification an acid having a $pK_a$ in aqueous solution at 25° C. of more than 2.8. Examples of suitable weak acids are lactic acid and salicylic acid.

The salt is a salt of metal of Group III to Group VIII of the Periodic Table according to Mendeleev. Examples of suitable salts are those of aluminium, copper and iron.

The salt must be selected from those salts which are sufficiently soluble in water to give a concentration of at least 10% by weight, based on the weight of water at 25° C. It is preferred to use a salt which has a solubility in water at 25° C. of at least 25% more preferably at least 35% wt/wt. High solubility is important as the amount of space available in the usual condensation reactor for addition of liquid is limited and high solubility enables the maximum quantity of salt to be introduced.

The quantity of the salt added to preferably sufficient to give at least one equivalent of cation for each equivalent of hydroxide where hydroxide catalyst is used and one equivalent of anion for each equivalent of acid where an acid catalyst is used.

The invention will now be illustrated by reference to the following Examples.

EXAMPLE 1

The control of a sodium hydroxide catalysed phenol-formaldehyde reaction is shown under approximately adiabatic conditions using 42% w/w aluminium lactate solution as the salt.

The formulation used was:

| | |
|---|---|
| Phenol | 100 g |
| Formalin 36.6% wt/wt | 150 g |
| 10 N Aqueous Solution NaOH | 13.3 g |

The reaction is carried out in a half liter vacuum flask. The phenol and formalin, at 60° C., are charged to the flask and the catalyst, preheated to 60° C. is added to start the reaction. The flask contents are stirred using a magnetic stirrer and the temperature change followed using a Comark thermocouple thermometer.

When no other addition was made to the flask, the temperature rose from 80° C. to boiling point in 1½ minutes. However, when 27 g of aluminium lactate solution was added when the temperature reached 80° C., the temperature rise ceased and the flask contents cooled.

EXAMPLE 2

An oxalic catalysed novolac reaction using the following ingredients was carried out:

| | |
|---|---|
| Phenol | 100 g |
| Formalin | 80 g |
| Oxalic acid dihydrate | 3.6 g) as a solution |
| Water | 8.0 g) |

The reaction was carried out as in Example 1 in a vacuum flask, starting the reaction at 80° C. Without any further additions the temperature of the flask content rose from 90° C. to boiling point in 3 minutes. However, in adding 12 g 42% w/w aluminium lactate solution at 90° C. the temperature rise ceased and the flask contents cooled.

I claim:

1. The process for retarding or stopping the condensation reaction between a phenol and an aldehyde in the presence of a catalyst which is a Group I or Group II metal hydroxide or a strong acid which comprises adding to the reaction at an elevated temperature an aqueous solution containing at least 10% by weight based on the weight of water, of a salt of a weak acid having a $pK_a$ in aqueous solution at 25° C. of more than 2.8 and a metal which is copper or a metal of Groups III to VIII of the Periodic Table.

2. The process according to claim 1 wherein the phenol is phenol, an alkyl or alkenyl phenol, or cresol.

3. The process according to claim 1 wherein the aldehyde is formaldehyde.

4. The process according to any one of claims 1, 2 or 3 wherein the molar ratio of phenol to aldehyde is from 0.5:1 to 3:1.

5. The process according to any one of claims 1, 2 or 3 wherein the catalyst is sodium hydroxide or potassium hydroxide.

6. The process according to claims 1, 2 or 3 wherein the catalyst is sulphuric acid or oxalic acid.

7. The process according to claims 1, 2 or 3 wherein the salt of a weak acid is a salt of lactic acid or salicylic acid.

8. The process according to claims 1, 2 or 3 wherein said metal is aluminium, copper and iron.

9. The process according to claims 1, 2 or 3 wherein the salt of a weak acid and a metal has a solubility in water at 25° C. of at least 25%.

10. The process according to claims 1, 2 or 3 wherein the salt of a weak acid and a metal of Group III to VIII of the Periodic Table is aluminium lactate.

11. The process according to claims 1, 2 or 3 wherein the quantity of salt of a weak acid and a metal which is added is sufficient to give at least one equivalent of cation for each equivalent of hydroxide catalyst used or one equivalent of anion for each equivalent of acid catalyst used.

12. The process of claim 1 wherein the metal is a metal other than chromium.

* * * * *